United States Patent [19]

Masili

[11] 4,086,578
[45] Apr. 25, 1978

[54] ELECTRONIC CIRCUITS FOR THE GENERATION OF SPECIAL EFFECTS IN THE VISUALIZATION SYSTEM OF SYMBOLS ON A KINESCOPE ESPECIALLY FOR TELEVISION GAMES

[75] Inventor: Dino Masili, Pordenone, Italy

[73] Assignee: Industrie A. Zanussi S.p.A., Pordenone, Italy

[21] Appl. No.: 588,779

[22] Filed: Jun. 20, 1975

[30] Foreign Application Priority Data

Jul. 23, 1974 Italy ............................... 45731/74

[51] Int. Cl.² .................................................. G08B 5/36
[52] U.S. Cl. ........................... 340/324 AD; 273/85 R; 273/DIG. 28; 340/384 E
[58] Field of Search .................... 340/324 A, 324 AD; 273/DIG. 28

[56] References Cited

U.S. PATENT DOCUMENTS

| | | | |
|---|---|---|---|
| 3,659,284 | 4/1972 | Rusch | 340/324 AD |
| 3,659,285 | 4/1972 | Baer et al. | 340/324 AD |
| 3,793,483 | 2/1974 | Bushnell | 273/DIG. 28 |
| 3,874,669 | 4/1975 | Ariano et al. | 340/324 A |

Primary Examiner—David L. Trafton
Attorney, Agent, or Firm—Holman & Stern

[57] ABSTRACT

An electronic circuit is disclosed, of the kind used in simulated television games, in which the positions of certain symbols representing objects necessary to the performance of a game, such as the pads and the ball for simulating a table tennis or lawn tennis game, are governed by the players through the manipulation of circuit controlling knobs, the improvement consisting in that supplementary circuit means are provided to render the display of the positions of certain symbols more accurate and detailed. For example, it is possible, by adopting the supplementary circuit means of the invention, to display not only the position of a table tennis ball relative to the pads and the game field, but also to simulate certain refinements of the game, in the case in point, to simulate spin strikes impressed to the ball, smash strikes and the like. The improvement also involves a more realistic acoustical simulation of the strikes imparted by a pad to the ball.

5 Claims, 17 Drawing Figures

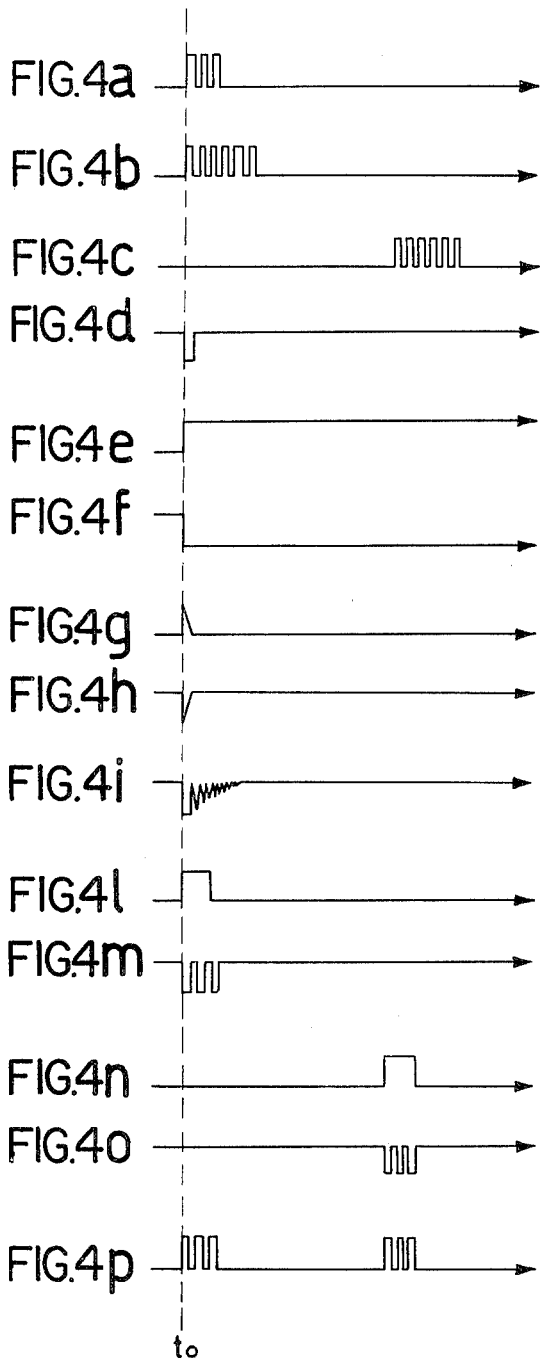

ELECTRONIC CIRCUITS FOR THE GENERATION OF SPECIAL EFFECTS IN THE VISUALIZATION SYSTEM OF SYMBOLS ON A KINESCOPE ESPECIALLY FOR TELEVISION GAMES

This invention relates to improvements in the electronic circuits for the generation of special effects in the systems which are adapted to visualize on a kinescope symbols the position of which on the screen can be adjusted, either automatically and/or manually or semi-automatically. More particularly, the invention relates to the devices by means of which there can be performed and visualized on a screen of a kinescope, or the like, the so-called "television games." Several electronic devices are known of the kind referred to above, by means of which it is possible to visualize on the screen of a kinescope a plurality of symbols the relative positions of which can be governed so as to simulate one or more popular games. For example, a device of the kind referred to is known for simulating on the screen of a television set the ping pong, or table tennis game. Such a device essentially comprises a phase shifter and coincidence circuit for horizontal and vertical synchronism pulses, which is adapted to generate a signal which is visualized on the screen in the form of a luminous area representing a ping-pong ball. Respective and similar circuits generate two further signals which are visualized in the form of luminous areas (one on the right and one on the left of the screen) which represent the ping pong bats. By acting upon the phase shifting of the synchronism pulses it is possible to vary the vertical and/or the horizontal position of the bats (for example manually by means of potentiometers) and the vertical and horizontal position of the ball (in an automatic and manual manner). A coincidence detecting circuit between one of the bats and the ball (which is displaced in a certain direction) causes the displacement of the ball towards the opposite bat, and so forth until one of the players which drive the bats misses the ball. To make the game more realistic, moreover, when the ball hits either bat a sound signal can be generated by means of a loudspeaker as actuated by a signal comprising a pulse train, this sound signal, however, does not faithfully reproduce the sound of an actual ball hit by a bat, as would be desirable.

It would also be desirable, and this is the main object of the invention, to increase the degree of difficulty of the game by equipping a device of the kind referred to above with an electronic circuit which is adapted to allow the ball hit by the bat in a particular way may automatically undergo a so-called "spin effect."

Further to improve the realistic aspect of the game, another object of the invention is that of equipping a device of the kind referred to above with an electronic circuit which is adapted to generate, as the ball hits, on the screen, an obstacle as foreseen in the game, a sound substantially indentical to the similar sound of an actual game, that is, one represented by a dampened oscillation.

These objects are achieved, according to the invention, in an electronic circuit for the generation of special effects in the systems for visualizing symbols on a kinescope, especially for television games, said circuit comprising first means for generating a video signal adapted to be visualized on the picture tube screen as a first symbol whose position is variable both in the horizontal and vertical direction by means of respective phase shifting units, second and third generators of respective video signals which represent a second and a third symbol whose position on the screen is variable in the vertical direction, first coincidence detecting means between the signals of said first and said second or third symbol and associated to said horizontal phase shifting unit to invert the direction of horizontal displacement of said symbol in response to said coincidence. The circuit further comprises fourth and fifth means generating respective video signals which represent a fourth and a fifth symbol having a fixed position on the screen, and second means for detecting the coincidence between the signals of said first and said fourth or fifth symbol and associated with said vertical phase shifting unit for inverting the direction of vertical displacement of the first symbol aforesaid. The circuit according to the invention is mainly characterized in that it comprises, in addition, further means for generating a signal representing a portion of said second and third symbol, said additional generating means being associated to the output of said first, second and third generating means as well as to said second generating means, the latter being adapted to produce through said vertical phase shifting unit a control signal for inverting the vertical displacement of said first symbol in response to the coincidence of said signal representing the first symbol with said signal representing said portion of the second or the third symbol. Said first detecting means comprise two complementary outputs at which there are present respective electric signals substantially in steplike form in response to the coincidence of signals of said first and second or third symbol. The circuit according to the invention is further characterized in that said complementary outputs are connected, through respective derivating means, to a unidirection conduction summation circuit the output of which is connected, in turn, to a loudspeaker, known per se and having an internal impedance which is substantially inductive and resistive, so as to generate a sound signal which, due to the application to said impedance of derived and summed signals, is represented by a dampened oscillation.

Features and advantages of the invention will more clearly appear from the ensuing description, given by way of nonlimiting example, with reference to the accompanying drawings, wherein:

FIG. 1 substantially shows the principle diagram of a preferred embodiment of the circuit according to the invention.

FIGS. 2 and 3 diagrammatically show the way in which the symbols generated by the circuit of FIG. 1 are visualized on the screen of a picture tube, in the respective operative conditions, and FIG. 4a depicts the time relationships of a "game ball" signal;

FIG. 4b depicts the time relationship of a first "playing bat" signal;

FIG. 4c depicts the time relationship of a second "playing bat" signal;

FIG. 4d depicts the time relationship of the output of gate 10;

FIG. 4e depicts the time relationship of the output of gate 12;

FIG. 4f depicts the time relationship of the output of gate 13;

FIG. 4g depicts the time relationship of the input to diode 32;

FIG. 4h depicts the time relationship of the input to diode 33;

Figure 1:
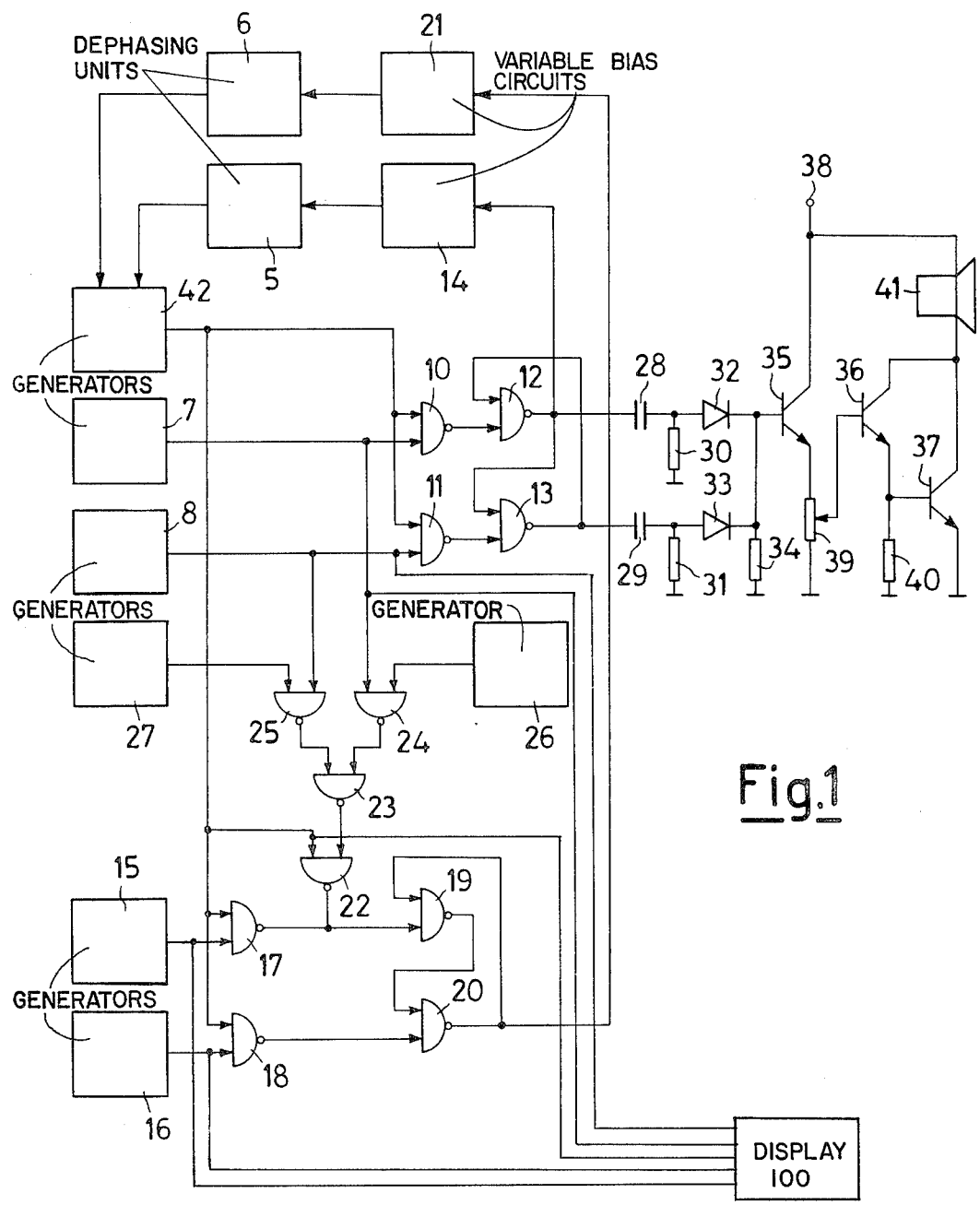

FIG. 4*i* depicts the time relationship of the input to loud speaker 41;

FIG. 4*l* depicts the time relationship of the "pulse" signal;

FIG. 4*m* depicts the time relationship of the "top portion" of the bat in FIG. 4*b*;

FIG. *n* depicts the time relationship of the second "pulse" signal:

FIG. 4*o* depicts the time relationship of the "top portion" of the bat in FIG. 4*c*; and FIG. 4*p* depicts the time relationship of the summation signal.

For convenience of description, it should be borne in mind that in the example shown reference is had to the case in which by means of the circuit according to the invention, it is desired to simulate the table tennis or ping pong game.

With reference to the drawings, such a circuit comprises a generator 42 of a first impulsive signal (FIG. 4*a*) adapted to be displayed on the screen 9 of a picture tube 100 as a symbol 4' (game ball) the position of which can be varied both horizontally and vertically by means of respective phase shifting units 5 and 6, the outputs of which drive the generator 42. The circuit comprises in addition two generators 7 and 8 of respective impulsive signals (FIGS. 4*b*, 4*c*) which represent a second and a thrid symbol 7' and 8' (playing bats) the position of which on the screen 9 can be varied in the vertical direction. The generators 42, 7 and 8 and the phase shifting units 5 and 6 can be of any known type. The output of the generator 42 is connected to the respective inputs of two gates 10 and 11 of the "NAND" type, a second input of which is connected to the output of the generator 7 and to the output of the generator 8, respectively. The outputs of the gates 10 11 drive, respectively, two further gates 12 and 13 (of the NAND type like all the gates illustrated) forming a flip-flop and forming with the gates 10, 11 a coincidence detecting circuit. More particularly, the output of the gate 13 is connected to an input of the gate 12, the output of which is connected, in turn, to an input of the gate 13. The output of the gate 12 (which represents the output of the coincidence circuit) is also connected, through a conventional variable bias circuit 14, to a driving input of the horizontal phase shifting unit 5. The circuit of FIG. 1 further comprises two generators, known per se, 15 and 16 for generating respective impulsive signals (substantially identical to those of FIGS. 4*b*, 4*c*) which represent further symbols 15' and 16' (top and bottom borderlines of the game field) the outputs of the generators 15 and 16 respectively drive two gates 17 and 18, to a second input of which there is connected the output of the generator 42. By their own outputs, the gates 17 and 18 drive further gates 19 and 20, with which they make up a coincidence detecting circuit which is substantially identical to the one described above. More particularly, the gates 19 and 20 are mutually connected like the gates 12 and 13. The output of the gate 20 (which represents the output of the associated coincidence circuit) is also connected, through a variable bias circuit 21 similar to 14, to a driving input of the vertical phase shifting unit 6. The input to the gate 19 as driven by the gate 17 is also connected to the output of a gate 22 having two inputs which are respectively connected to the output of the generator 42 and to the output of another gate 23. The latter, in its turn, has a first input connected to the output of a gate 24 and a second input connected to the output of a gate 25. The gate 24 is driven by the outputs of the generator 7 and as a generator 26, known per se, of a pulse signal (FIG. 4*l*). The gate 25 is driven by the outputs of the generator 8 and of a generator 27, similar to 26, of a pulse signal (FIG. 4*n*). The outputs of gates 12 and 13 are complementary and connected to respective derivation circuits as formed by capacitors 28, 29 and resistors 30, 31, as shown in FIG. 1. Through respective diodes 32, 33 which make up with a resistor 34 a summing circuit, the derivation circuits drive the base of a transistor 35 which is an impedance adaptor and forms with two transistors 36, 37, as connected in a Darlington pattern, a matching circuit. Obviously, the circuits of the transistors 35, 36, 37 are intended as being connected at 38 to a normal biassing source (not shown) and are completed by biassing resistors 39 (preferably variable resistors) and 40, as shown in FIG. 1. Lastly, the collectors of the transistors 36 and 37, control a loudspeaker 41 of conventional make and having an internal impedance which is substantially inductive and resistive.

As regards the operation of the circuit shown in FIG. 1, it should be borne in mind that all the gates, being of the NAND type, have at their outputs a signal of "0" level (no voltage) only when at the associated inputs there is the time coincidence of respective signals of "1" level, that is, greater than "0".

Let it be assumed that the ball 4' is displaced along a certain direction away of the bat 8' towards the bat 7'. If the latter hits the ball, this fact means that the respective signals 4*b* and 4*a* are in time coincidence at the instant (FIGS. 4*a* – 4*p*) and are applied simultaneously to the inputs of the gate 10, at the output of which there is thus delivered a signal (FIG. 4*d*) having at least a negative impulse. Conversely, since at the inputs of the gate 11 no coincidence is experienced at the instant to, at the output of such gate a signal of level "1" is present. Summing up, at the instant $t_o$, the output of the gate 10 drives the flip-flop as made up by the gates 12 and 13 so that the outputs of the latter switch, respectively, from the level "0" to the level "1" (FIG. 4*e*) and from the level "1" to the level "0" (FIG. 4*f*). The positive step of FIG. 4*e* thus actuates, through the circuit 14 of variable bias, the horizontal phase shifting unit 5. The latter inverts in a known manner in the direction of horizontal phase shifting of the signal 4*a* as generated in the block 42, so that the ball 4' is displaced now in the reverse direction, that is, towards the bat 8'. It can easily be imagined that if the ball is hit in a subsequent instant by the bat 8', the stages as described above are substantially repeated, the difference being that the coincidence takes place at the inputs of the gate 11 between the signals 4*a* and 4*c*. Still at the instant $t_o$, the derivation unit 28, 30 converts the signal 4*e* into a positive pulse (FIG. 4*g*) which, through the diode 32, drives the base of the transistor 35. Also the derivation unit 29, 31 converts the signal 4*f* into a negative pulse (FIG. 4*h*) which, however, is arrested by the diode 33, on account of the bias thereof. The pulse 4*g* is conventionally processed in the matching circuit which comprises the transistors 35, 36, 37 and at the collector of the transistor 37 there is obtained, due to the inductive-resistive load as represented by the loudspeaker 41, a signal (FIG. 4*i*) comprising a dampened oscillation. Such an oscillation is then converted by the loudspeaker into a corresponding sound signal which (as has been seen also experimentally) is substantially identical to the similar one of an actual table tennis game. From the foregoing disclosure it is apparent that such a sound signal is generated whenever either bat 7', 8' hits the ball 4'. Since the output signals of the generators 15 and 16 (that is, the signals of the lines 15' and 16' of the game field boundary) are substantially identical to those produced by the generators 7 and 8 (FIG. 4b and 4c), the operation of the coincidence circuit comprising the gates 17, 18, 19, 20 is similar to the one as described for the coincidence circuit comprising the gates 10, 11, 12, 13. As a single substantial change, the output of the gate 20 actuates through the variable bias circuit 21 the vertical phase shifting unit 6, which conventionally inverts the direction of vertical phase shifting of the signal 4a as generated in the block 42. This fact means that, if the ball 4' which is displaced towards either pad 7', 8', hits for example the bottom line 15', it will invert the direction of its vertical displacement. The way in which the ball 4' bumps on the line 15' and the pad 7' is indicated by the arrow 43 of FIG. 2. At the inputs of the gates 24, 25 there is thus at every instant of time the coincidence of the signals referred to above, so that, at the outputs of the gates 24 and 25 there are present signals as indicated, respectively, in FIGS. 4m, 4o are representative of a top portion (7'' and 8'' ) respectively) of the bats. These signals are converted by the gate 23 into a summation signal (FIG. 4p) which, when it coincides with the signal 4a of the ball 4' (for simplicity this coincidence is indicated in FIGS. 4a – 4p, at the instant $t_o$) at the inputs of the gate 22, causes, at the output of the latter gate, a signal, for example of the kind shown in FIG. 4d. This is the case in which the ball 4' has hit the portion 7'' of the bat 7'. In view of that which has been described above, if the ball 4' has previously bounced on the line 15' (or is anyhow being displaced towards the top portion), the flip-flop comprising the gates 19 and 20 is in a state which can be switched by the negative pulse 4d, so that the phase shifting unit 6 is controlled so as to invert the direction of vertical phase shifting of the signal 4a. Summing up, in the assumed case in which the ball 4' hits the top portion of the bat 7' (similar considerations apply, obviously, also to the bat 8') with an upward path, the ball inverts its displacement in the vertical direction, in addition to that in the horizontal direction. As shown by the arrows 44 and 45 of FIG. 3, it is thus possible, as a function of the skill of the players which actuate the bats, to carry out so-called "spin strikes" which make the game more interesting. Willfully, the spin strike is not effected, conversely, if the ball 4' strikes the top portion of the bats 7' or 8' with a downward path. In such a case, in fact, the flip-flop 19, 20 is in a state which is not influenced by the negative pulse 4d, so that the phase shifting unit 6 is not controlled so as to invert the direction of vertical phase shifting of the signal representing the ball.

From the foregoing, it is apparent that the circuit in question achieves in a simple and efficient way the objects of the invention, by improving the performances of a television game in broad sense.

Obviously, such a circuit can undergo many changes; for example, it is apparent for anyone skilled in the art that with simple circuit veriations it is possible further to increase the degree of difficulty and realism of the game, while remaining with the scope of the invention. More particularly, the spin strike can be obtained when the ball 4' is displaced with a downward path (if so, the output of the gate 22 should be connected to the output of the gate 18, rather than with that of the gate 17), or with a path having either a downward or an upward trend.

What is claimed is:

1. An electronic circuit for the generation of special effects in the symbol display systems on a picture tube, especially for television games, comprising first means generating a video signal adapted to be displayed on the picture tube screen as a first symbol the position of which is variable in the horizontal and vertical direction by means of respective phase shifting devices, second and third means generating respective video signals representing a second and a third symbol the position of which on the screen is variable in the vertical direction, first means for detecting the coincidence between the signals of said first and said second or third symbol and associated to said horizontal phase shifting device for inverting the direction of horizontal displacement of said first symbol in response to said coincidence, fourth and fifth means for generating respective video signals representative of a fourth and a fifth symbol having a fixed position on the screen, and a second means for detecting the coincidence between the signals of said first and said fourth or fifth symbol and associated to said vertical phase shifting unit for inverting the direction of the vertical displacement of the first symbol aforesaid, characterized in that it comprises in addition further means for generating a signal representing a portion of said second and third symbol, said further generating means being associated to the output of said first, second and third generating means as well as to said second detecting means, this latter being adapted to produce through said vertical phase shifting device a control signal for the reversal of the vertical displacement of said first symbol in response to the coincidence of said signal representative of the first symbol and of said signal representative of said portion of the second or the third symbol.

2. An electronic circuit according to claim 1, wherein said first detecting means comprise two complementary outputs at which there are present respective electric signals substantially in step form in response to the coincidence of the signals of said first and second or third symbol, characterized in that said complementary outputs are connected, through respective derivation means, to a unidirectional conduction summing circuit, the output of which is connected, in turn, to a conventional loudspeaker having an internal impedance of substantially inductive and resistive nature, so as to generate a sound signal which, by the application of said impedance of said derived and summed signals, is represented by a dampened oscillation.

3. An electronic circuit according to claim 1, characterized in that said second coincidence detecting means comprise a first NAND gate having two inputs connected to the output of said first and fourth generating means, respectively, a second NAND gate having two inputs connected to the output of said first and fifth generating means, respectively, the outputs of said first and second gate being connected to a first input respectively of a third and a fourth NAND gate the outputs of which are mutually connected to respective sound inputs of the same fourth and third gates, the output of said fourth circuit being in addition connected to a control input of said vertical phase shifting device and the first input of said third circuit being associated to the output of said further generating means.

4. An electronic circuit according to claim 1, characterized in that said first coincidence detecting means comprise a first NAND gate having two inputs connected to the output of said first and second generating means respectively, a second NAND gate having two inputs connected to the output of said first and third generating means respectively, the outputs of said first and second gate being connected to a first of a third and a fourth NAND gate respectively, the outputs of which are mutually connected to respective second inputs of the same fourth and third gates, the output of said first circuit being in addition connected to a control input of said horizontal phase shifting device.

5. An electronic circuit according to claim 2, characterized in that the output of said summing circuit is connected to said loudspeaker through a conventional impedance matching circuit.

* * * * *